April 22, 1969     T. D. SANDERS     3,440,435

ELECTRICAL POWER SUPPLY APPARATUS

Filed Dec. 12, 1966

WITNESSES:

INVENTOR
Terry D. Sanders

BY
ATTORNEY

United States Patent Office

3,440,435
Patented Apr. 22, 1969

3,440,435
ELECTRICAL POWER SUPPLY APPARATUS
Terry D. Sanders, Pittsburgh, Pa., assignor to Westinghouse Electric Corporation, Pittsburgh, Pa., a corporation of Pennsylvania
Filed Dec. 12, 1966, Ser. No. 601,186
Int. Cl. H02j 9/00
U.S. Cl. 307—66                                                    8 Claims

ABSTRACT OF THE DISCLOSURE

This invention relates to new and improved power supply apparatus for the electrical lighting systems on transit vehicles, and to new and improved time delay and low voltage recognition circuitry for such apparatus. The main power supply for the vehicle lighting system is a battery charger, which is connected to the lighting system through an asymmetrically conductive device and the normally open contacts of an electromagnetic switching device. A battery is connected to the vehicle lighting system through the normally open contacts of the electromagnetic switching device. A time delay circuit is connected across the electrodes of the asymmetrically conductive device, which allows the battery to supply electrical energy to the lighting system for a predetermined period of time after the battery charger ceases to supply electrical energy for this purpose.

---

Figure 1:
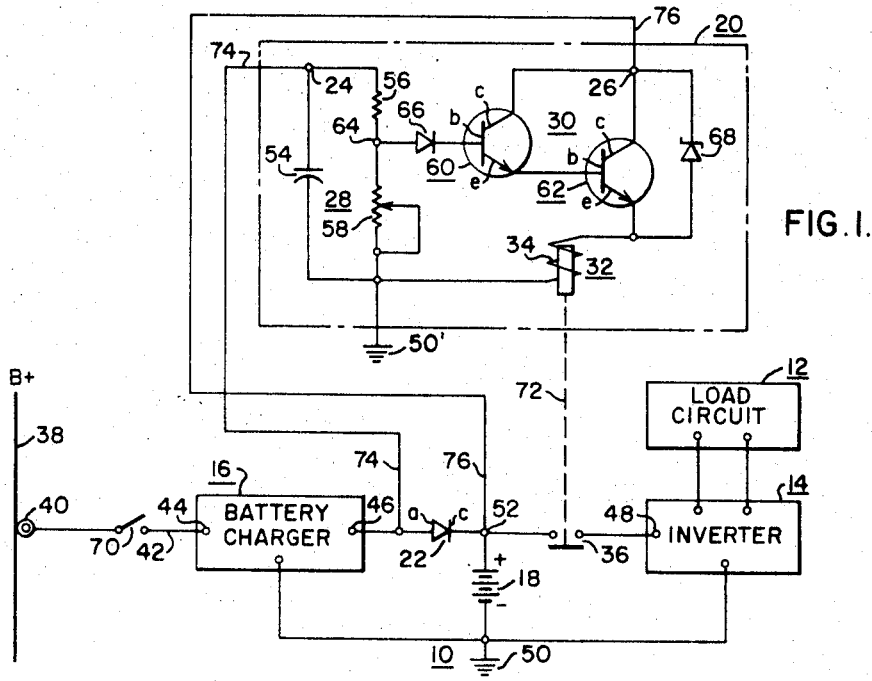

The lighting systems on many rail-type transit vehicles are energized by electrical inverters, static or rotating, which receive their unidirectional energy from a third rail. Since there are gaps in the third rail for expansion purposes, it is necessary to provide an auxiliary source of electrical energy which will automatically energize the lighting system when the third rail follower is crossing a gap. The operation of the lighting inverter will, therefore, be continuous, preventing flicker in the lighting system. The auxiliary source of electrical energy may be an electrical storage battery, which is kept charged by a battery charger connected to the third rail supply. The battery charger, which provides a unidirectional output voltage slightly greater than the fully charged voltage of the electrical storage battery, may be used as the main power supply for the lighting inverter. Thus, the battery charger would supply electrical energy for the operation of the lighting inverter until the output voltage of the battery charger drops below the output voltage of the storage battery, at which time the storage battery would supply energy for the inverter.

The storage battery, however, should only be used for short periods of time, such as when the transit car is crossing gaps in the third rail. For example, the storage battery should not continue to supply energy to the inverter, beyond a predetermined short period of time, when the transit car stops with the third rail follower on a gap in the third rail; or, when the battery charger malfunctions. It is necessary to protect the storage battery from excessive drain, by automatically disconnecting the lighting inverter from the storage battery after a predetermined time interval, which starts when the primary supply, i.e., the battery charger, is not supplying electrical energy for the inverter.

If the storage battery is not fully charged, or for some other reason is not able to maintain a predetermined minimum output potential for the predetermined time period while it is being called upon to supply electrical energy to the lighting inverter, this condition should be automatically recognized by the power supply apparatus and the inverter should be disconnected from the storage battery, regardless of whether or not the predetermined timed period has been completed. This feature is especially desirable when the lighting inverter is of the static type. When the voltage applied to static electrical inverters drops below a predetermined minimum, the static switching devices in the inverter may not turn off at the proper time, which causes the inverter to fault and place a short circuit across the battery through the inverter.

Accordingly, it is an object of the invention to provide new and improved power supply apparatus for the lighting systems on transit vehicles.

Another object of the invention is to provide new and improved static power supply apparatus for lighting systems on transit vehicles, which will automatically operate the lighting system from an electrical storage battery for a predetermined period of time upon the loss of the main source of electrical potential.

Still another object of the invention is to provide new and improved static power supply apparatus for the lighting systems on transit vehicles, which will automatically operate the lighting system on an electrical storage battery for a predetermined period of time upon the loss of the main source of electrical potential, subject to an overriding control responsive to the voltage of the electrical storage battery, which will disconnect the lighting system in the event the output voltage of the electrical storage battery drops to a predetermined minimum.

A further object of the invention is to provide a new and improved static time delay circuit which will continue to operate a control device from a second potential for a predetermined period of time after the removal of a first potential.

Another object of the invention is to provide a new and improved static time delay circuit which will continue to operate a control device from a second electrical potential for a predetermined period of time after the removal of a first electrical potential, subject to an overriding control responsive to the magnitude of the second electrical potential, which terminates the operation of the control device before the end of the predetermined period of time in the event the second potential drops below a predetermined magnitude.

Briefly, the invention accomplishes the above-cited objects by providing new and improved power supply apparatus in which the battery charger is connected to a lighting inverter through the anode-cathode electrodes of an asymmertically conductive device, and through the normally open contacts of an electromagnetic control device, respectively. The electrical storage battery is connected to the junction between the cathode electrode of the asymmetrically conductive device, and the normally open contacts. A static time delay circuit, which includes static switching means, controls the operation of the electromagnetic control device and its normally open contacts. The static time delay circuit has first and second input terminals connected to the anode and cathode electrodes, respectively, of the asymmetrically conductive device. Thus, both of the input terminals of the static time delay circuit are effectively connected to the output of the battery charger, as long as it is operative. When the battery charger ceases to operate, the potential is removed from the first input terminal, and the electrical storage battery is effectively connected to the second input terminal. The electromagnetic coil of the electromagnetic control device, and the static switching means, are connected to the second input terminal. The static switching means receives its control signal from the first input terminal. Removal of the potential from the first input terminal removes the drive signal from the static switching means, which is immediately supplanted by a timed drive signal from an R–C network, precharged from the first terminal. If the electrical potential is not returned to the first terminal before the end of the predetermined timed period, the static switching means switches to its nonconductive state at the end of the period, disconnecting the lighting inverter from the storage battery.

A Zener diode and additional static switching means are used to provide an undervoltage recognition circuit responsive to the output voltage of the electrical storage battery. If the output voltage of the storage battery falls below a predetermined minimum magnitude determined by the Zener diode, the additional static switching means will shunt the timed drive signal from the static switching means connected to the electromagnetic coil of the electromagnetic control device, and immediately switch the static switching means to its nonconductive state.

Figure 2:
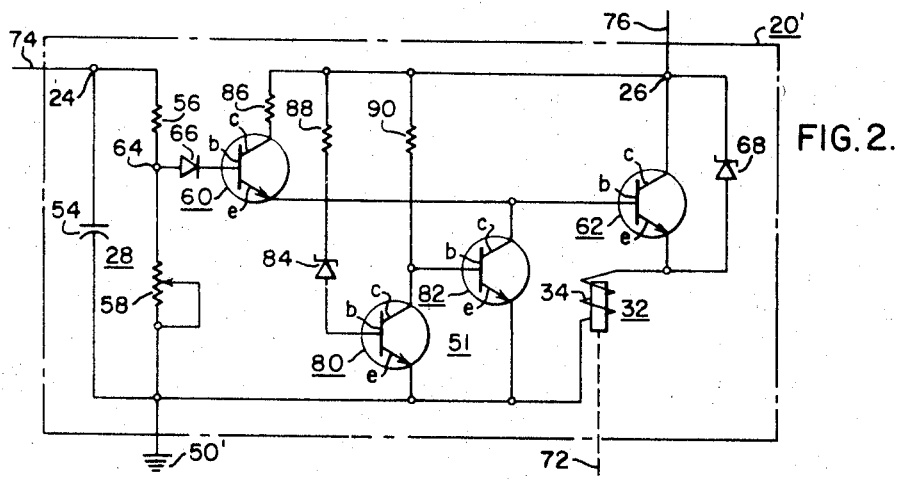

Further objects and advantages of the invention will become apparent from the following detailed description, taken in connection with the accompanying drawings, in which:

FIGURE 1 is a schematic diagram of power supply apparatus suitable for the lighting systems on transit vehicles, constructed according to an embodiment of the invention, and FIG. 2 is a schematic diagram of a time delay and low voltage recognition circuit constructed according to another embodiment of the invention.

Broadly, the invention relates to new and improved power supply apparatus for transit vehicle lighting systems, including time delay means which allows an inverter connected to the lighting system to be switched from a main or primary source if electrical potential, to a reserve or auxiliary source of electrical potential, for a predetermined period of time. The timing is accomplished by a static time delay circuit which initiates the timed period when a signal in the form of an electrical potential is removed from one of its input terminals. FIG. 1 is a schematic diagram which illustrates an embodiment of this concept.

More specifically, FIG. 1 is a diagrammatic representation, partially schematic and partially in block form, of power supply apparatus 10 for the lighting system of rail-type transit vehicles. Power supply apparatus 10 includes a load circuit 12, which is the lighting system load; an electrical inverter 14, which converts unidirectional energy to an alternating current potential for the operation of load circuit 12; a battery charger 16, which is the main or primary source of unidirectional energy for the operation of inverter 14; an electrical storage battery 18, which is charged by battery charger 16, and which provides the auxiliary source of unidirectional energy for the operation of inverter 14; static time delay means 20, which controls the time that storage battery 18 is connected to inverter 14 when battery charger 16 fails to provide an electrical potential; and, an asymmetrically conductive device 22.

Time delay means 20, in general, includes first and second input terminals 24 and 26, an R–C circuit 28, static switching means 30, and an electromagnetic control device 32, which includes an electromagnetic coil 34 and normally open contacts 36.

Battery charger 16 receives an electrical potential from a third rail source, represented by bus 38, via a follower or third rail shoe 40, and conductor 42. The third rail source may be a direct current potential, with the magnitude of the direct current potential applied to input terminal 44 of battery charger 16 being changed in the battery charger to a magnitude at output terminal 46, which is suitable for the operation of inverter 14, and for the charging of electrical storage battery 18. Suitable battery chargers for converting the third rail supply to a direct current potential having the desired magnitude are well known in the art.

Output terminal 46 of battery charger 16 is connected to input terminal 48 of inverter 14, through asymmetrically conductive device 22, and through the normally open contacts 36. Asymmetrically conductive device 22 may be a diode, such as a silicon diode, having an anode electrode $a$ and a cathode electrode $c$. The anode electrode $a$ is connected to output terminal 46 of battery charger 16, and the cathode electrode $c$ is connected to one side of the normally open contacts 36. The remaining side of the normally open contacts 36 is connected to input terminal 48 of inverter 14. Both the battery charger 16 and inverter 14 may be connected to ground 50, which returns to the grounded side of the third rail source through the wheels of the transit car and their associated rails. The electrical storage battery 18 is connected to the junction 52 between the cathode electrode $c$ and contacts 36, with the positive terminal of the battery being connected to junction 52, and the negative terminal being connected to ground 50.

The output voltage of battery charger 16 is slightly higher than the fully charged value of electrical storage battery 18. Since battery charger 16 and electrical storage battery 18 are connected in parellel with respect to the input of inverter 14, the higher output voltage of battery charger 16 will prevent battery 18 from supplying electrical energy to inverter 14. Battery charger 18 will thus supply all of the electrical energy to inverter 14 when contacts 36 are closed, and at the same time will charge battery 18. When the magnitude of the output voltage of battery charger 16 drops below the magnitude of the output voltage of battery 18, such as when follower 40 is crossing an expansion gap in the third rail 38, battery 18 will provide the electrical energy necessary for operating inverter 14. Inverter systems suitable for operating the lighting system of transit cars are well known in the art.

If the transit car should stop with follower 40 on a gap in the third rail 38, or if battery charger 16 should malfunction, time delay means 20 disconnects battery 18 from inverter 14 after a predetermined period of time, by opening normally open contacts 36. This action is necessary in order to prevent an excessive drain on battery 18. Thus, it is the function of time delay means 20 to start the predetermined timed period when battery 18 starts to supply electrical energy to inverter 14, and if the battery charger has not resumed its burden of supplying electrical energy to inverter 14 before the end of the predetermined timed period, it disconnects battery 18 from inverter 14. If battery charger 16 resumes its required function before the end of the timed period, the time delay circuit should be automatically reset to await the next instance when battery 18 will again be called upon to furnish electrical energy to inverter 14.

Time delay means 20 provides these functions by connecting input terminal 24 to the anode electrode $a$ of asymmetrically conductive device 22 via conductor 74, and by connecting input terminal 26 to the cathode electrode $c$ of asymmetrically conductive device 22 via conductor 76. As long as battery charger 16 is providing the proper magnitude of unidirectional potential, both input terminals 24 and 26 will be at substantially the same potential. If battery charger 16 is not providing a potential, then asymmetrically conductive device 22 will be reverse biased, the voltage applied to input terminal 24 will be zero, and the voltage applied to input terminal 26 will be the output voltage of battery 18. The loss of voltage from input terminal 24 is the "signal" which starts the timing function of time delay means 20.

Terminal 24 provides a potential for the functions of charging R–C circuit 28, and for providing a drive signal which switches static switching means 30 to its conductive state. Terminal 26 provides the electrical potential which energizes electrical control device 32 when static switching means 30 is in its conductive state.

As shown in FIG. 1, the R–C circuit 28 may include a capacitor 54 connected between terminal 24 and ground 50', and a voltage divider network comprising resistors 56 and 58 serially connected from terminal 24 to ground 50'. Resistor 58 may be adjustable, as shown, if it is desired to provide an adjustable time delay.

Static switching means 30 may include one or more static switching devices, each having first and second main electrodes, and a control electrode. As shown in FIG. 1, these static switching devices may be NPN junction type transistors 60 and 62, each having collector, emitter, and base electrodes, c, e and b, respectively. While only one switching device is actually required for the desired function, two are shown in FIG. 1, connected to increase the circuit gain.

The base electrode b of transistor 60 is connected to junction 64 between resistors 56 and 58. This connection may be made through diode 66, which is poled to conduct current into the base electrode b. Diode 66 will insure that transistor 60 will be switched to its conductive state only when a potential is applied to terminal 24, and not by collector to base leakage current in transistor 60 when there is no potential at terminal 24. The collector electrodes c of transistors 60 and 62 are connected to terminal 26, emitter electrode e of transistor 60 is connected to the base electrode b of transistor 62, and the emitter electrode e in transistor 62 is connected to ground 50' through the electromagnetic coil 34 of control device 32. A Zener type diode 68 may be connected across the collector and emitter electrodes, c and e, of transistor 62 in order to protect transistor 62 against voltage transients.

To operate power supply apparatus 10, switch 70, which may be connected between follower 40 and the input terminal 44 of battery charger 16, is closed, which energizes battery charger 16. Prior to the closing of switch 70, capacitor 54 will be discharged, switching means 30 will be non-conductive, and normally open contacts 36 will be open. Closing switch 70 applies the output potential of battery charger 16 to terminals 24 and 26 of time delay means 20. Capacitor 54 will be charged to the output potential of battery charger 16, and a base drive voltage or signal will be applied to transistor 60 from voltage divider means 28. The current flow from the base to the emitter electrodes of transistor 60 will switch it to its saturated or conductive condition, with the resulting current flow from terminal 26 through the collector and emitter electrodes of transistor 60 providing base drive for transistor 62, switching it to its saturated or conductive state. Current will then flow through the electromagnetic coil 34 of control device 32, causing normally open contacts 36 to close, as actuated by a mechanical linkage indicated by dotted line 72. Inverter 14 will thus be energized, and it will supply energy to load circuit 12. Battery 18 will also be charged by battery charger 16.

Now, assume that battery charger 16 fails to provide an output potential. Asymmetrically conductive device 22 will be reverse biased, and the voltage applied to terminal 24 will drop to zero. Terminal 26 will be energized by battery 18. Capacitor 54 will discharge through resistors 56 and 58, paralleled by diode 66 and the base to emitter electrodes of transistor 60, which maintains transistor 60 in its conductive condition until the base drive provided by capacitor 54 is reduced to the point where transistor 60 drops out of saturation. The base drive applied to transistor 62 will, therefore, be gradually reduced, and the voltage applied to electromagnetic coil 34 will start to drop until the dropout point of coil 34 is reached. At this point, contacts 36 will open and disconnect inverter 14 from battery 18. If battery charger 16 again provides a potential before the dropout point of electromagnetic coil 34 is reached, capacitor 54 will be recharged, or "reset," and base drive will be supplied to the transistors as hereinbefore described. Thus, inverter 14 will continue to operate when battery charger 16 fails to supply an output potential, for periods of time within the time delay period determined by time delay means 20. If the period of time which the battery charger fails to supply an output potential exceeds the timed period provided by time delay means 20, the battery will be protected against excessive drain by the opening of contacts 36.

The circuit of FIG. 1 may be modified to prevent reverse leakage current through diode 22 from charging capacitor 54, by connecting a resistor (not shown) from the anode electrode a of diode 22 to ground, which will drain the reverse leakage current. A diode (not shown) should then be connected in conductor 74, which is poled to prevent capacitor 54 from discharging through this leakage current resistor. A resistor (not shown) may also be connected in conductor 74 to limit the charging current of capacitor 54.

If, during the timing period provided by time delay means 20, the output voltage of battery 18 should fall below a predetermined magnitude, the inverter may fault, if it is of the static type, which would place a short circuit across battery 18. This condition is undesirable, and the inverter should be disconnected from battery 18 when the battery voltage drops to near the faulting point of the inverter, regardless of the time left in the normal time delay function.

Time delay means 20 may be modified to sense the output voltage of battery 18, to determine when the output voltage drops to a predetermined magnitude, and to deenergize control mans 32 when this magnitude is reached. This modification of time delay means 20 to include low voltage recognition means 51, is shown in FIG. 2, with the modified time delay means being reference 20', and with like components in FIGS. 1 and 2 being given like reference numerals.

More specifically, the low voltage recognition feature, shown in FIG. 2, requires the addition of two static switching devices, each having a control electrode and first and second main electrodes, such as NPN junction type transistors 80 and 82, each having base, collector and emitter electrodes b, c and e, respectively. The collector electrode c of transistor 80 is connected to terminal 26 through resistor 90, its emitter electrode e is connected to ground 50', and its base electrode b is connected to terminal 26 through Zener diode 84 and resistor 88. Zener diode 84 is poled to block current flow into the base electrode b of transistor 80 until the voltage applied to terminal 26 exceeds a predetermined value. Resistor 88 limits current flow through Zener diode 84. The base electrode b of transistor 82 is connected to the collector electrode c of transistor 80, its collector electrode c is connected to the base electrode b of transistor 62, and its emitter electrode e is connected to ground 50'. A resistor 86 is also connected between the collector electrode c of transistor 60 anud terminal 26. Resistor 86 prevents shorting the voltage applied to terminal 26 to ground 50' through transistors 60 and 82, when both are in their conductive state at the same time.

In the operation of the modified time delay means 20', if the voltage applied to terminal 26 is above the Zener voltage of Zener diode 84, Zener diode 84 will conduct in its "reverse" direction, providing base drive for transistor 80, which switches it to its conductive state. The base electrode b of transistor 82 is thus connected to ground 50' through transistor 80, and the low voltage recognition circuit 51 has no effect on the operation of the time delay circuit. Should the voltage applied to terminal 26 drop below the reference voltage of Zener diode 84, which indicates that the faulting voltage of inverter 14 is being approached, Zener diode 84 will revert to its blocking state, transistor 80 will switch to its nonconductive state, and transistor 82 will be biased "on" through resistor 90. When transistor 82 switches to its conductive condition, base drive for transistor 62 from transistor 60 will be shorted to ground, and control means 32 will immediately drop out, opening contacts 36 and disconnecting inverter 14 from battery 18. Thus, the low voltage recognition circuit 51 overrides the time delay feature of the circuit, and will terminate the time delay when the battery voltage drops to a predetermined point.

In summary, there has been disclosed new and improved power supply apparatus for lighting systems on transit vehicles, which provides the functions of continuity, by overriding short periods of time when the normal inverter power supply is not operating; battery protection, by disconnecting the battery after a predetermined time interval, if the output potential from the main power supply has not reappeared before the end of the timed period; and, protection of the battery and inverter from short circuits in the inverter due to low battery voltage. There has also been disclosed new and improved time delay circuitry, as well as low voltage recognition circuitry, which may be utilized with the disclosed power supply arrangement.

Since numerous changes may be made in the above-described apparatus and different embodiments of the invention may be made without departing from the spirit thereof, it is intended that all matter contained in the foregoing description or shown in the accompanying drawings, shall be interpreted as illustrative, and not in a limiting sense.

I claim as my invention:

1. Power supply apparatus for the lighting system on a transit vehicle comprising:
   electrical inverter means having output terminals adapted for connection to the lighting system, and input terminals;
   first means having input terminals adapted for connection to a source of electrical potential, and output terminals for providing a first unidirectional potential;
   electrical storage battery means providing a second unidirectional potential, which has a magnitude less than the magnitude of the first unidirectional potential;
   asymmetrically conductive means having anode and cathode electrodes;
   time delay means including static switching means having main electrodes and a control electrode, capacitor means, and an electrical control device having an electromagnetic coil and normally open contacts;
   said first means and said electrical storage battery means being connected in parallel circuit relation with respect to the input terminals of said electrical inverter means, with said first means being connected to said electrical inverter means through the anode-cathode electrodes of said asymmetrically conductive means and the normal open contacts of said electrical control device, respectively, and said electrical storage battery means being connected to said electrical inverter means through the normally open contacts;
   the main electrodes of said static switching means and the electrical coil of said electrical control device being connected across said electrical storage battery means;
   said capacitor means being connected across the output terminals of said first means;
   and, the control electrode and one of the main electrodes of said static switching means being connected across the output terminals of said first means;
   said first unidirectional potential charging said capacitor means and switching said static switching means to its conductive state, connecting said first unidirectional potential to said electrical inverter means and charging said electrical storage battery means;
   said capacitor means discharging and applying a signal to the control electrode of said static switching means when said first means fails to provide the first unidirectional potential, to maintain said static switching means in its conductive state for a predetermined period of time, and operate said electrical inverter means on said second unidirectional potential during this timed period.

2. The power supply apparatus of claim 1 wherein said static time delay means includes voltage sensing means responsive to the magnitude of said second unidirectional potential, at least during the period of time when said capacitor means is discharging and providing a signal to the control electrode of said static switching means, said voltage sensing means being conductive above a predetermined voltage magnitude, and nonconductive below the predetermined magnitude, and means responsive to said voltage sensing means which shunts the signal from said capacitor means away from the control electrode of said static switching means, when said voltage sensing means becomes nonconductive, causing said static switching means to switch to its nonconductive state before the end of the predetermined period of time.

3. A static time delay circuit comprising:
   at least first and second input terminals adapted for connection to first and second electrical potentials, respectively,
   capacitor means having first and second ends, with the first end being connected to said first input terminal,
   voltage divider means having first and second ends, connected to the first and second ends, respectively, of said capacitor means,
   and static switching means including at least one static switching device having first and second main electrodes and a control electrode, the control electrode of said at least one static switching device being connected to a predetermined point on said voltage divider means, the first main electrode of said static switching device being connected to said second input terminal, and the second main electrode being connected to the second ends of said capacitor means and said voltage divider means,
   said first electrical potential charging said capacitor means and providing a drive signal at the control electrode of said static switching device which switches said device to its conductive state, allowing current to flow from said second input terminal through the main electrodes of said static switching device,
   said capacitor means discharging through said voltage divider means upon the removal of the first potential from the first input terminal, which provides a signal at the control electrode of said static switching device which maintains said static switching device in its conductive state for a predetermined period of time after the removal of said first electrical potential.

4. The static time delay circuit of claim 3 wherein said static switching device is a transistor.

5. The static time delay circuit of claim 3 including a control device having an electromagnetic coil connected in series circuit relation with the main electrodes of said static switching device.

6. The static time delay circuit of claim 3 wherein said static switching means includes first and second static switching devices, each having first and second main electrodes and a control electrode, the control electrode of said first static switching device being connected to a predetermined point on said voltage divider means, the first main electrodes of said first and second static switching devices being connected to said second input terminal, the second main electrode of said first static switching device being connected to the control electrode of said second static switching device, the second main electrode of said static switching device being connected to the second ends of said capacitor means and said voltage divider means.

7. The static time delay circuit of claim 6 including a Zener diode, and third and fourth static switching devices each having first and second main electrodes and a control electrode, the first and second main electrodes of said third static switching device being connected to the first and second main electrodes, respectively, of said second static switching device, the first and second main electrodes of said fourth static switching device being connected to the control and second main electrodes, respectively, of said second static switching device, said Zener diode being connected from said second input terminal to the control electrode of said third static switching device, said Zener diode being poled to block current flow from said second input terminal to the control electrode of said third static switching device when the second electrical potential falls below a predetermined magnitude, the control electrode of said fourth static switching device being connected to the first main electrode of said third static switching device, said third static switching device being in its conductive state when the second electrical potential exceeds the predetermined magnitude determined by said Zener diode, which maintains said fourth static switching device in its nonconductive state, said third static switching device switching to its nonconductive state when the second electrical potential falls below the predetermined magnitude, allowing said fourth static switching means to switch to its conductive state and shunt control signals fom the control electrode of said second static switching means, which switches said second static switching means to its nonconductive state.

8. The static time delay circuit of claim 7 including a control device having an electromagnetic coil connected in series circuit relation with the main electrodes of said second static switching device.

References Cited

UNITED STATES PATENTS

| | | | |
|---|---|---|---|
| 3,043,989 | 7/1962 | Nash et al. | 307—66 X |
| 3,267,288 | 8/1966 | Maiden et al. | 307—66 |

ROBERT K. SCHAEFER, *Primary Examiner.*

H. J. HOHAUSER, *Assistant Examiner.*